United States Patent
Murray et al.

(10) Patent No.: US 7,134,041 B2
(45) Date of Patent: Nov. 7, 2006

(54) SYSTEMS AND METHODS FOR DATA BACKUP OVER A NETWORK

(75) Inventors: Bill Murray, Oakville (CA); Andre Lewitzky, Oakville (CA); Tim Boldt, Mississauga (CA)

(73) Assignee: EVault, Inc., Emeryville, CA (US)

( * ) Notice: Subject to any disclaimer, the term of this patent is extended or adjusted under 35 U.S.C. 154(b) by 661 days.

(21) Appl. No.: 10/251,499

(22) Filed: Sep. 20, 2002

(65) Prior Publication Data

US 2003/0056139 A1    Mar. 20, 2003

Related U.S. Application Data

(60) Provisional application No. 60/323,959, filed on Sep. 20, 2001.

(51) Int. Cl.
*G06F 11/00* (2006.01)
(52) U.S. Cl. .......................................... 714/4; 707/204
(58) Field of Classification Search .................... 714/4; 711/162, 216; 707/204
See application file for complete search history.

(56) References Cited

U.S. PATENT DOCUMENTS

| | | | | | |
|---|---|---|---|---|---|
| 5,813,009 | A | * | 9/1998 | Johnson et al. | 707/100 |
| 2001/0037323 | A1 | * | 11/2001 | Moulton et al. | 707/1 |
| 2001/0049779 | A1 | * | 12/2001 | Shimada et al. | 711/205 |
| 2002/0107877 | A1 | * | 8/2002 | Whiting et al. | 707/204 |

* cited by examiner

*Primary Examiner*—Scott Baderman
*Assistant Examiner*—Joshua Lohn
(74) *Attorney, Agent, or Firm*—Beyer Weaver & Thomas LLP

(57) ABSTRACT

A system and method for data backup over a network has been developed. The method includes creating a baseline copy of the data files that are to be archived. When the data is subsequently being backed up, the system checks for the presence of newly added files by comparing the sort order of the present data files with the sort order of the baseline copy. Any newly added files are then saved to the baseline copy. The system checks for any changes in existing files by comparing the hash numbers of the present data files with the hash numbers of the data files in the baseline copy. Any changed files are then merged into their corresponding data files in the baseline copy.

35 Claims, 2 Drawing Sheets

SYSTEMS AND METHODS FOR DATA BACKUP OVER A NETWORK

CROSS-REFERENCE TO RELATED APPLICATIONS

This application claims priority from a U.S. Provisional Patent Application No. 60/323,959 entitled "Systems and Methods for a Data Backup Over a Network" that was filed on Sep. 20, 2001.

BACKGROUND OF INVENTION

1. Field of the Invention

The invention relates generally to computer software. More specifically, the present invention provides for methods and systems for electronic data archival, backup and recovery over a network.

2. Background Art

A great deal of information is stored electronically and must be backed up or archived in a systematic fashion to protect against the loss of critical data. The traditional process of data archival and/or backup involves writing a copy or mirror image of the data to a tape or other data storage device on a regularly scheduled basis, often nightly. Once the data is copied to the data storage device, the data storage device is physically moved off-site to another, secure location where it is stored. If the original data is lost or corrupted, a copy of the data is available and can be retrieved from the off-site location. A drawback to the traditional back up process is that it is cumbersome and time-consuming. In addition, as the amount of data being backed up increases, the number and cost of storage devices needed to keep copies of the data increases as well.

Another back up process that has grown increasingly popular in recent years involves the use of wide are networks to transmit back up data to a secure site. Data management companies, such as EVault, Inc. now provide backup and archival services to allow a company to transmit backup data to a data manager on a regularly scheduled basis. The backup data is usually encrypted to protect against the release of proprietary information and a third-party data storage manager handles the storage and recovery of the business data. By sending information to a third-party data storage manager, a company avoids the cost of paying for and maintaining its own data storage system and can take advantage of the economies of scale available to a data storage manager.

A drawback to the process of transmitting backup data to a data storage manager over networks like the internet is the length of transmission. In many cases, the amount of data to be backed up exceeds the capacity of the communication line between a company and its data storage manager. When large or numerous files are involved, the traditional data backup process of copying or mirroring an entire data system requires a great deal of time and/or a tremendous amount of bandwidth, neither of which is typically available. Furthermore, only a small percentage of the files typically need to be backed up per session. One of the ways used to address this problem involves the use of delta extraction algorithms. A delta extraction algorithm monitors the changes made to the data files of a company between backups and rather than transmitting the entire file, transmits only the changes to the file. This results in a much quicker backup process as files that are unchanged are not transmitted. Additionally, it reduces the amount of storage needed for a backup.

For example in some delta extraction processes, selected files are processed in a depth first order, ascending alphabetically. For example, a "C:" drive under Windows NT might be processed in the following order:

C:\autoexec.bat
C:\boot.ini
C:\Dir1\
C:\Dir1\Data1.dat
C:\Dir1\Data2.dat
C:\Dir1\Sub1\Image1.bmp
C:\Dir1\Sub1\Image2.bmp
C:\Dir1\Text1.dat
C:\Dir1\Text2.dat
C:\Dir2\Data1.dat
C:\Dir2\Data2.dat
C:\Dir2\Image1.bmp
C:\Dir2\Image2.bmp
C:\pagefile.sys.

These files are sequentially compared against a delta mapping file (DTA), using alphabetic comparisons to determine if a file is new or part of a prior backup. Next, like files are compared block by block to see if the file had been changed ("delta changes") since the last backup. If a new file is discovered, it is copied in its entirety. Files that were deleted in the interim since the last backup are ignored and are no longer used as part of future backups. Once this sometimes lengthy process is completed, the data is transmitted from a client application to a server (file names and changed/new blocks of data).

At the server, files included in the backup are processed in the order in which they were backed up, depth first order, ascending alphabetically. These files are sequentially merged with the previous backup data, using alphabetic comparisons to determine if a file is new or part of a prior backup. Like files are merged or indexed block by block to update and verify the new delta block changes. New files, those that were not present in any of the prior backups, are merged in their entirety. Deleted files are ignored, that is, treated as no longer part of the backup data.

Not withstanding the use of a delta extraction algorithm, backup processes can take a long time when large amounts of data are involved and when a backup of a complex or extensive data system is involved. Some sub-directories may contain upwards of 10,000 separate files and take so long to sort that problems such as slowdowns, timeouts, or even system crashes frequently occur. Client-side applications known in the art that perform the delta extraction algorithms rely heavily upon sorting routines. These routines sort a log of file changes to allow the changes to be matched with the baseline files that are stored off-site by the data storage manager. The client-side process of extracting the changes and transmitting the log is often time-consuming.

SUMMARY OF INVENTION

In some aspects, the invention relates to a method for storage of data files, comprising: creating a baseline copy of the data files, where each baseline data file has a sort order position and a hash number; performing a backup session with at least one updated data file, where each updated data file has a sort order position and a hash number; determining if the updated data file does not exist as any baseline data file by comparing the sort order positions of the baseline data files with the sort order positions of the updated data files; wherein if the updated data file does not exist as any baseline data file, the updated data file is added to the baseline copy of data files; determining if the updated file is an new version of any baseline data file by comparing the hash numbers of the baseline data files with the hash numbers of the updated data files; and wherein if the updated file is a new version of any baseline data file, the updated data file is merged with the baseline data file in the baseline copy of data files.

In other aspects, the invention relates to a method for storing data files, comprising: step of creating a baseline copy of the data files; step of running a backup session with updated data files; step of identifying and adding new backup data files to the baseline copy of data files by comparison of sort order positions; and step of identifying and merging a pre-existing backup data file into a corresponding baseline data file by comparison of hash numbers.

Other aspects and advantages of the invention will be apparent from the following description and the appended claims.

BRIEF DESCRIPTION OF DRAWINGS

It should be noted that identical features in different drawings are shown with the same reference numeral.

DETAILED DESCRIPTION

Figure 1:
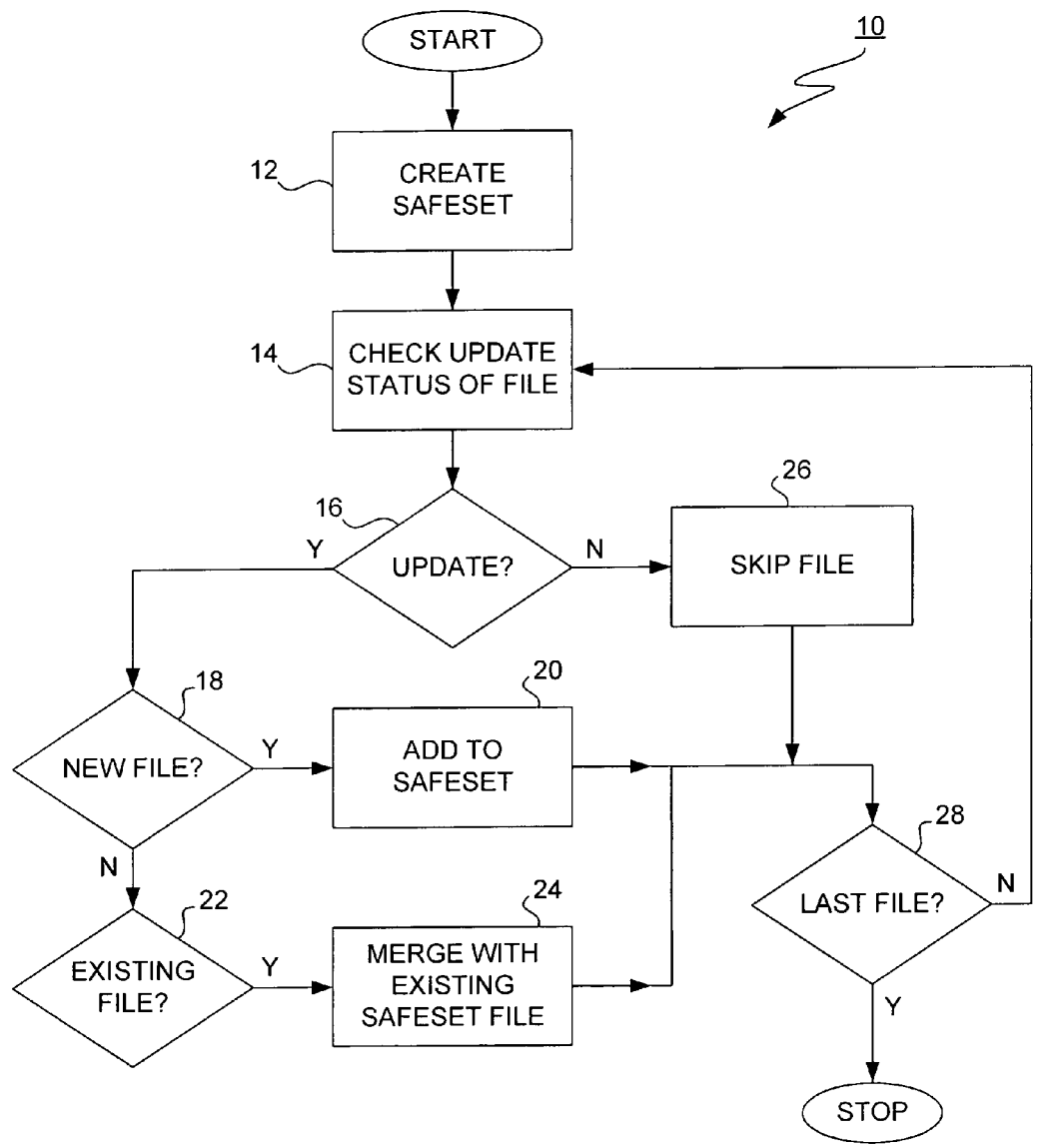
FIG. 1 shows one embodiment of a method of incremental data storage and backup in accordance with the present invention.

In accordance with an embodiment of the present invention, a new process for backing up data using a network includes the steps as described hereafter. The process involves receiving data files for an initial backup and later receiving periodic backups or updates of new additions and changes to the data files. During these backups, the process analyzes the new data and determines whether to insert the data as a new file; merge it into an updated file with its earlier version; or skip a file that is unchanged.

Typical computer operating systems will deliver data files in a consistent and non-random order. For example, at a client application, selected files are processed in depth first order as they appear in the file system so that no alphabetical sorting is performed. Using the files of the previous sorting example, a "C:" drive under Windows NT might be processed as follows:

C:\autoexec.bat
C:\pagefile.sys
C:\Dir1\
C:\Dir1\Data1.dat
C:\Dir1\Data2.dat
C:\Dir1\Text2.dat
C:\Dir1\Sub1\Image1.bmp
C:\Dir1\Sub1\Image2.bmp
C:\Dir1\Text1.dat
C:\Dir2\Data2.dat
C:\Dir2\Image2.bmp
C:\Dir2\Image1.bmp
C:\Dir2\Data1.dat
C:\boot.ini The sort order of these files is tracked by a system "pointer". The pointer is a variable that contains the address location of data files rather than the data itself. The value of the pointer may typically be expressed as a number (e.g., 0001, 0002, 0003, etc.). As files are inserted or deleted in a directory or subdirectory, the value of the pointer for each file is adjusted accordingly to reflect any change in the address location of that file. Typically, files that are added to the sort order are given a higher pointer value.

In one embodiment of the present invention, the system begins by saving all of the data files in a "safeset". The safeset serves as a baseline copy of the data and it is periodically updated by the storage manager. During a subsequent backup procedure, the system uses the sort order of the safeset to determine if a present file to be updated already exists within a previous backup. This is accomplished by comparing the pointer values for the updated files with the safeset data files in accordance with the sort order of both sets of files. If the pointer value of present backup file is greater than the pointer value of the present safeset file, then the present updated file is a new file and it is saved as an additional file to the safeset. This procedure works because the files are delivered in the same sort order by the operating system. Consequently, any change in the pointer value of an additional file will be detected by a difference in the value of pointers for the data files in the safeset.

The system establishes a heuristic hashing index to determine if the present file is an update of a pre-existing file in the safeset. Hashing is an algorithm that detects changes in a data file by creating a "hash total" of numbers. The hash total is created by adding numbers taken from various points in the data. This total is compared with a previously created hash total for the same file. Any change in the data file will result in a different hash total because the numbers that are added to determine the total will be changed and/or moved to different locations in the file. Consequently, if the hash totals are different, the data has been changed and the file must be updated in the safeset.

A hashing index contains the previous hash totals for each file in the safeset. This index is typically created along with the safeset to provide a baseline hash total for each data file in the safeset. The system determines if the present file is an update of an existing file by comparing the hash total of the present updated file with the hash total of the corresponding file in the safeset. If the two hash totals are different, the data of the file has changed since the previous backup. The present file is then merged with the pre-existing file and saved to the safeset as an updated file. Also, the hashing index is updated with the new hash total for use during subsequent backups. However, if the hash totals of both files are the same, then the data in the file has not been updated and the file is skipped.

In further embodiments of the present invention, the storage of the data files in the safeset is optimized for economy and efficiency. The cost of different types of storage media varies. Examples of storage media, in order of access speed, include: RAID disc; optical; nearline; and tape. Generally, the faster storage media is more expensive. Consequently, it is advantageous to store infrequently accessed and/or updated data files in less expensive and slower storage media.

In some embodiments of the present invention, the system monitors the access frequency for each data file. Data files are then grouped according to this access frequency. The least frequently accessed group of data files is moved to the least expensive storage areas while the most frequently accessed group of data files is moved to the faster storage areas. This process will maximize economic benefit by lowering storage costs while minimizing retrieval and backup delays by utilizing the different storage media most efficiently. The monitoring of the access frequency is an ongoing procedure and the system will move files among the storage areas accordingly as their individual access frequency changes.

In alternative embodiments of the present invention, different storage processes are used. FIG. 1 shows a method 10 of incremental data storage and backup. Incremental data storage involves periodically updating the safeset and deleting the incremental data after the update of the safeset is complete. The first step of the method is to create a safeset 12 that functions a baseline copy of all of the data files to be stored. Next, upon starting an update session to backup the data, each individual file to be backup is checked 14 to see if it falls into one of three categories: it is a new file; it is an update of an existing safeset file; or it is a file with no changes in its data. Any new files are identified 18 by comparing the values of their pointers as previously described. If a new file is identified, it is added to the safeset 20. Any updates to existing safeset files are identified 22 by comparing the hash totals of the files with the totals in the hash index as previously described. If a file's data has changed, the changes are merged with the existing safeset file 24. If a file is not new and its data has not changed, the file is skipped 26. The process continues until the last file is checked 28 and then the process is stopped until the next update session.

Figure 2:
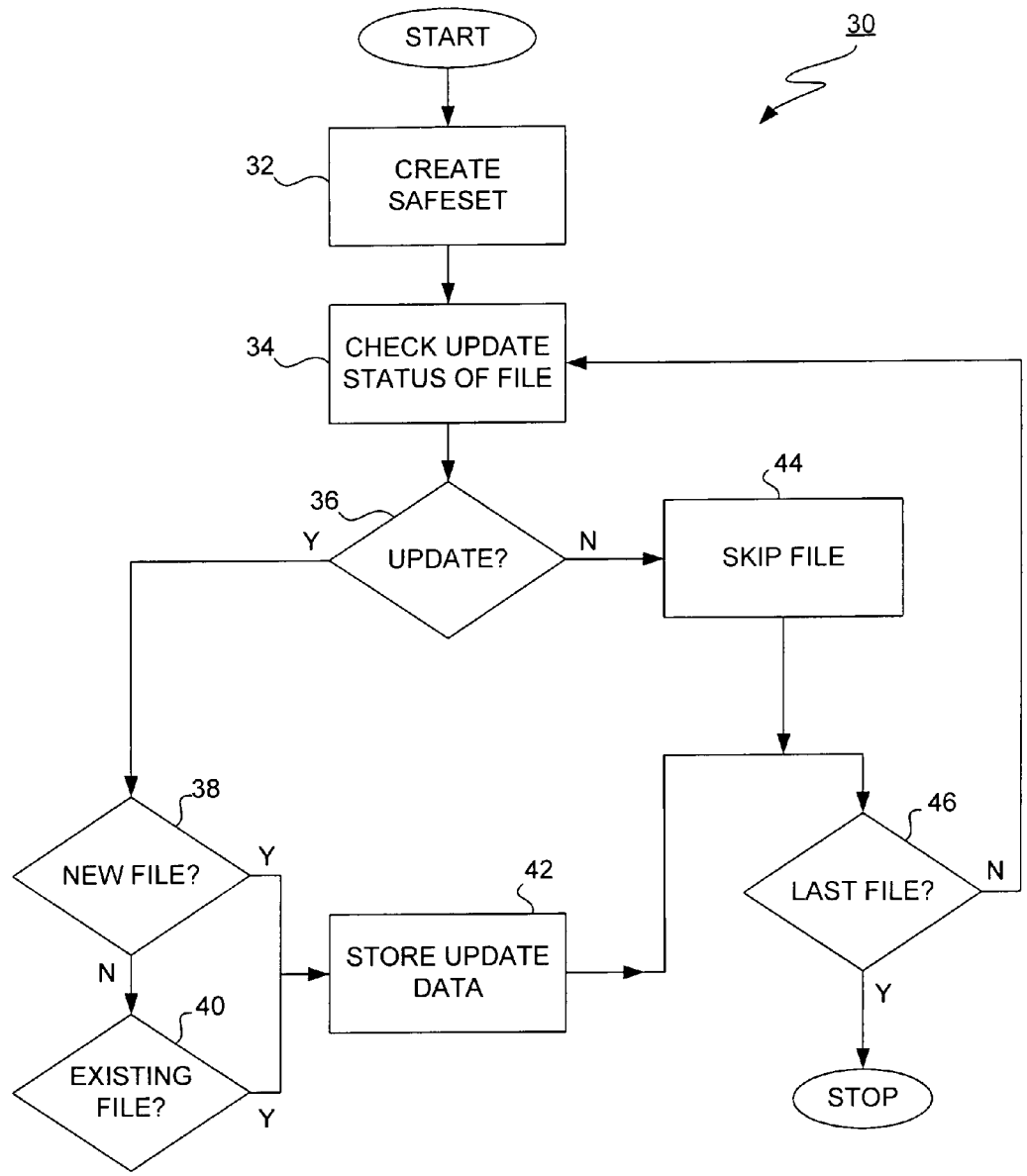
FIG. 2 shows one embodiment of a method of differential data storage and backup in accordance with the present invention.

FIG. 2 shows a method 30 of differential data storage and backup. Differential data storage involves identifying and storing updates and additions separately from the data files in the safeset. The updates are not added or merged with the files from the safeset until the specific data file is retrieved. As with the previous method shown in FIG. 1, the first step of the present method is to create a safeset 32 that functions a baseline copy of all of the data files to be stored. Next, upon starting an update session to backup the data, each individual file to be backup is checked 34 to see if it falls into one of three categories: it is a new file; it is an update of an existing safeset file; or it is a file with no changes in its data. Any new files are identified 38 by comparing the values of their pointers as previously described. Any updates to existing safeset files are identified 40 by comparing the hash totals of the files with the totals in the hash index as previously described. New files and updates to existing files are then stored separately from the data files of the safeset 42. If a file is not new and its data has not changed, the file is skipped 44. The process continues until the last file is checked 46 and then the process is stopped until the next update session.

It should be noted for both methods 10 and 30 described in FIGS. 1 and 2, that the first steps of creating a safeset 12 and 32 are only performed during the initial archival of the data files. Subsequent periodic backup sessions will skip this procedure and merely refer to the previously established safeset to determine the backup status of the existing files.

In alternative embodiments of the present invention, the safeset of data files is broken down into segments for storage. This process may be done for more economical and efficient storage as previously described. The safeset is broken down into segments that are stored in a safeset pool. In addition to the pool files themselves, the pool will include a pool file location list. This list stores the names, locations, etc. of the various segments. If the differential data storage method described in FIG. 2 is used, a pool index file is also created that lists all versions and updates of the pool files.

The use of these methods to determine if a file is new or if a file is an update is advantageous in its speed and efficiency. The process of comparing pointer values and comparing hash totals is a faster and more efficient way to determine if data needs to be updated in a series of files than individually comparing the data blocks of a file.

While the invention has been described with respect to a limited number of embodiments, those skilled in the art, having benefit of this disclosure, will appreciate that other embodiments can be devised which do not depart from the scope of the invention as disclosed here. Accordingly, the scope of the invention should be limited only by the attached claims.

What is claimed is:

1. A method for storage of data files, comprising:
creating a baseline copy of the data files, where each baseline data file has a position indicator and a calculated value calculated based upon the content of the corresponding baseline data file, wherein the position indicator is separate from the calculated value wherein the position indicator associated with the baseline data file is not calculated based upon the content of the corresponding baseline data file and wherein the position indicator associated with each baseline data file indicates a position of the baseline data file with respect to other baseline data files;
performing a backup session with at least one updated data file, where each updated data file has a position indicator and a calculated value calculated based upon the content of the corresponding updated data file, wherein the position indicator associated with the updated data file is not calculated based upon the content of the corresponding baseline data file;
determining if the updated data file does not exist as any baseline data file using the position indicator of the updated data file, wherein the position indicator of the updated file is separate from the calculated value associated with the updated file and wherein the position indicator of the updated data file indicates whether the updated data file is a file that exists among the baseline copy of the data files;
wherein if the updated data file does not exist as any baseline data file, the updated data file is added to the baseline copy of the data files;
determining if the updated file is a new version of any baseline data file by comparing the calculated values associated with the baseline data files with the calculated value associated with the updated data file; and
wherein if the updated file is a new version of any baseline data file, the updated data file is merged with the baseline data file in the baseline copy of data files.

2. The method of claim 1, where the calculated value associated with each baseline data file is a hash number, and wherein the hash number of each baseline data file is kept in a hash line index.

3. The method of claim 1, where the baseline copy of the data files comprises multiple storage groups containing the baseline data files.

4. The method a claim 3, where the baseline copy of data files further comprises:
a location file, where the location file contains the name and location of each baseline data file; and
an index file, where the index file contains any updated data files and any new data files for the baseline copy of data files.

5. The method of claim 3, where the baseline data files are divided into the storage groups based on access frequency of the baseline data files.

6. The method of claim 1, where an updated data file is added to the baseline copy of data files during the backup session.

7. The method of claim 1, where an updated data file is added to the baseline copy of data files upon receiving a retrieval request.

8. The method of claim 1, where an updated data file is merged with any baseline data file during the backup session.

9. The method of claim 1, where an updated data file is merged with any baseline data file upon receiving a retrieval request.

10. The method as recited in claim 1, wherein each position indicator is a numerical indicator.

11. The method as recited in claim 1, wherein each of the position indicators is not a hash number.

12. The method as recited in claim 1, wherein each of the calculated values is a hash number.

13. The method as recited in claim 1, wherein the position indicator associated with the updated data file indicates whether the updated file does not exist as any baseline data file.

14. The method as recited in claim 1, wherein when the position indicator is not equal to a position indicator associated with one of the data files, the position indicator indicates that the updated file does not exist as one of the baseline data files.

15. The method as recited in claim 1, wherein when the position indicator is equal to a position indicator associated with one of the data files, the position indicator indicates that the updated file exists as one of the baseline data files.

16. The method as recited in claim 1, wherein determining if the updated data file does not exist as any baseline data file comprises:
 comparing the position indicators of the baseline data files with the position indicator of the updated data file.

17. The method as recited in claim 1, wherein the position indicators of the baseline data files indicate a sequence of the baseline data files with respect to one another and wherein the position indicator of the updated data file indicates whether the updated data file is within the sequence.

18. The method as recited in claim 17, wherein determining if the updated data file does not exist as any baseline data file comprises:
 determining whether the position indicator of the updated data file is within the sequence or equal to one of the position indicators associated with the baseline data files.

19. The method as recited in claim 1, wherein the position indicator of each of the baseline data files and the updated data file is an address or pointer indicating a location in memory.

20. The method as recited in claim 1, wherein the position indicators of the baseline data files indicate an order in which an operating system delivers the baseline data files.

21. The method as recited in claim 1, wherein the position indicators of the baseline data files are obtained without alphabetically sorting the baseline data files.

22. The method as recited in claim 1, wherein the calculated value associated with the updated data file is a single value and the calculated value associated with each of the baseline copy of the data files is a single value.

23. The method as recited in claim 1, wherein the calculated value associated with the updated data file is a single hash total value for the updated data file and the calculated value associated with each of the baseline copy of the data files is a single hash total value for the corresponding baseline data file.

24. A method for storing data files, comprising:
 running a backup session with one or more updated data files;
 identifying and adding new backup data files to the baseline copy of data files using a position indicator associated with each of the updated data files, wherein the position indicators are not calculated values that are calculated based upon the content of the updated data files; and
 identifying and merging each of the updated data files that correspond to a pre-existing backup data file into a corresponding baseline data file by comparison of a first calculated value calculated based upon the content of the corresponding baseline data file and a second calculated value calculated based upon the content of the updated data file.

25. The method as recited in claim 24, wherein the calculated value associated with the updated data file is a single value and the calculated value associated with each of the baseline copy of the data files is a single value.

26. The method as recited in claim 24, wherein the calculated value associated with each of the updated data files is a single hash total value for the updated data file and the calculated value associated with each of the baseline copy of the data files is a single hash total value for the corresponding baseline data file.

27. The method as recited in claim 24, wherein identifying and merging each of the updated data files that correspond to a pre-existing backup data file into a corresponding baseline data file comprises:
 identifying and merging a pre-existing backup data file into a corresponding baseline data file by comparison of hash numbers.

28. The method as recited in claim 24, wherein the position indicator associated with each of the updated data files indicates whether the corresponding updated data file does not exist as any baseline data file.

29. The method as recited in claim 24, wherein each of the position indicators is a numerical value or pointer.

30. The method as recited in claim 24, wherein the calculated values are hash numbers.

31. The method as recited in claim 24, wherein identifying and adding new backup data files to the baseline copy of data files comprises:
 comparing the position indicators of the updated data files with position indicators associated with the baseline copy of data files.

32. The method as recited in claim 24, wherein the position indicators of the baseline data files indicate a sequence of the baseline data files with respect to one another and wherein the position indicator of the updated data file indicates whether the updated data file is within the sequence.

33. The method as recited in claim 32, wherein determining if the updated data file does not exist as any baseline data file comprises:
 determining whether the position indicator of the updated data file is within the sequence or equal to one of the position indicators associated with the baseline data files.

34. A method for storage of data files, comprising:
 creating a baseline copy of the data files, where each baseline data file has a position indicator and a calculated value calculated based upon the data in the corresponding baseline data file, wherein the position indicator of the baseline data file is a numerical value or pointer that is separate from the calculated value, wherein the position indicator is not calculated based upon the data in the corresponding baseline data file and wherein the position indicator associated with each baseline data file indicates a position of the baseline data file with respect to other baseline data files;

performing a backup session with at least one updated data file, where each updated data file has a position indicator and a calculated value calculated based upon the data in the corresponding updated data file, wherein the position indicator is not calculated based upon the data in the corresponding baseline data file;

determining if the updated data file does not exist as any baseline data file using the position indicator of the updated data file, wherein the position indicator of the updated file is a numerical value or pointer that is separate from the calculated value associated with the updated file and wherein the position indicator of the updated data file indicates whether the updated data file is a file that exists among the baseline copy of the data files;

wherein if the updated data file does not exist as any baseline data file, the updated data file is added to the baseline copy of the data files;

determining if the updated file is a new version of any baseline data file by comparing the calculated values associated with the baseline data files with the calculated value associated with the updated data file; and wherein if the updated file is a new version of any baseline data file, the updated data file is merged with the baseline data file in the baseline copy of data files.

35. A method for storing data files, comprising:

running a backup session with one or more updated data files;

identifying and adding new backup data files to the baseline copy of data files using a position indicator associated with each of the updated data files, wherein the position indicators are not calculated values that are calculated based upon the data in the updated data files; and identifying and merging each of the updated data files that correspond to a pre-existing backup data file into a corresponding baseline data file by comparison of a first calculated value calculated based upon the data in the corresponding baseline data file and a second calculated value calculated based upon the data in the updated data file, wherein the position indicators are numerical values or pointers that are separate from the calculated values.

* * * * *